H. KELLER.
Reciprocating Winnowers.
No. 140,201. Patented June 24, 1873.
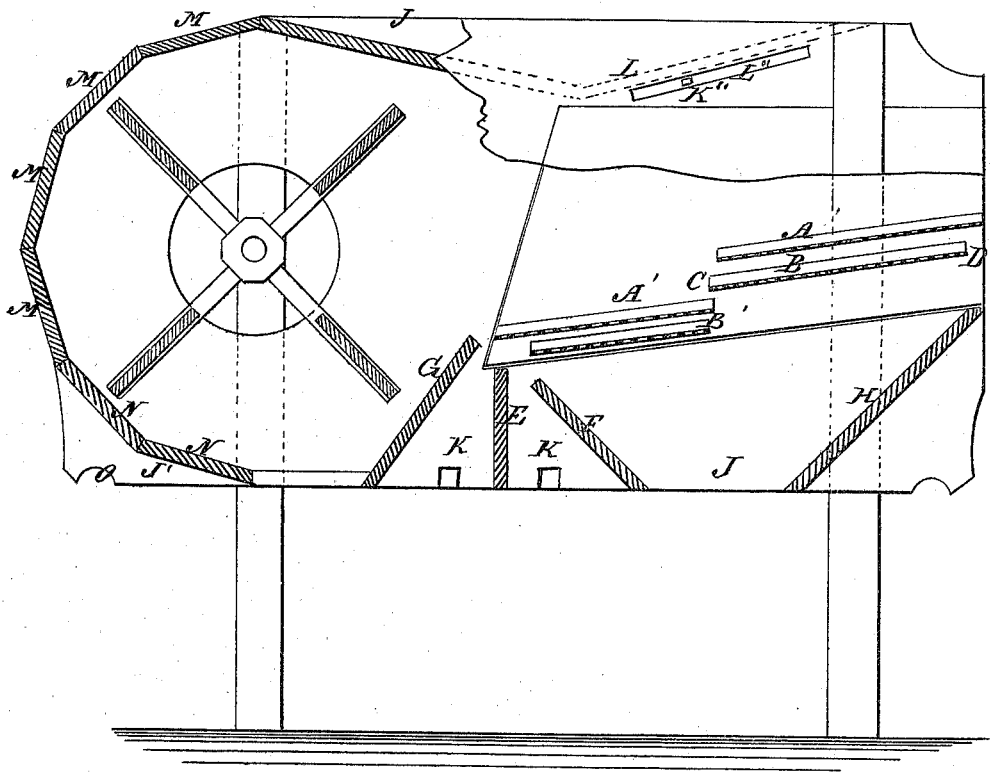

UNITED STATES PATENT OFFICE.

HENRY KELLER, OF SAUK CENTER, MINNESOTA.

IMPROVEMENT IN RECIPROCATING WINNOWERS.

Specification forming part of Letters Patent No. 140,201, dated June 24, 1873; application filed April 5, 1873.

*To all whom it may concern:*

Be it known that I, HENRY KELLER, of Sauk Center, in the county of Stearns and State of Minnesota, have invented a new and Improved Fanning-Mill, of which the following is a specification:

The invention consists in the improvement of grain-fans, as hereinafter described and pointed out in the claim.

The drawing is mainly a longitudinal sectional elevation of my improved fanning-mill with a small portion shown in side elevation.

A and A' represent the upper grading-screens; B and B', the lower one, which I make in two parts instead of one as heretofore, dividing them at C; and I elevate the upper sections above the planes of the lower ones, as shown, whereby I arrange them so that the wind from the fan can act with much better effect on the grain, both for separating the oats and other light matters at the upper end of the upper sections, and the screenings at the point where they are separated; and I make the upper section B of the lower screen shorter than the upper section A of the upper screen to give the oats a better chance of dropping down, as shown at D. The lower section B' of the lower grading-screen does not extend quite as low down as the end of the upper screen does, and delivers its grain between the partitions E of the grain-box and the side F of the screen-box. The upper screen delivers its grain on the other side of partition E between it and the partition G, which separates the grain-box from the fan-chamber. K represents slides on the sides of the grain-boxes, through which the grain is taken out. The partitions F E G, also the upper side H of the screen-box, are fitted in grooves in the sides J of the case. K' is the lever, to which the movable sides L of the hopper-bottom is connected for being opened and closed by it. The lever is pivoted at one end to one of the vertical sides of the hopper, and projects at the other through a long slot, L'', in the opposite side of the same, passing intermediately through an arm or lug attached to the under side of said movable part L of the hopper. M represents the four sides of the end of the fan-chamber, which are fastened onto the ends of the sides J of the case, and N the two sides which are fitted at the ends in grooves in the sides of said case to allow them to extend at J' to constitute the handles, wherein the notches O are formed for the hands.

Having thus described my invention, I claim as new and desire to secure by Letters Patent—

The sieves A B and A' B', arranged with respect to each other and to the grain-box E F G H, as and for the purpose described.

HENRY KELLER.

Witnesses:
A. BARTO,
N. H. MINER.